(12) United States Patent
Behr

(10) Patent No.: US 6,550,796 B2
(45) Date of Patent: Apr. 22, 2003

(54) VEHICLE SUSPENSION

(76) Inventor: Stephen V. Behr, 535 Jack Pine Ct., Indianapolis, IN (US) 46224

( * ) Notice: Subject to any disclaimer, the term of this patent is extended or adjusted under 35 U.S.C. 154(b) by 0 days.

(21) Appl. No.: 09/977,142

(22) Filed: Oct. 12, 2001

(65) Prior Publication Data

US 2002/0027332 A1 Mar. 7, 2002

Related U.S. Application Data

(63) Continuation-in-part of application No. 09/477,323, filed on Jan. 4, 2000, now abandoned.
(60) Provisional application No. 60/114,965, filed on Jan. 5, 1999.

(51) Int. Cl.[7] .............................. B60G 3/20; B60G 11/16
(52) U.S. Cl. ........................ 280/124.125; 280/124.136; 280/124.179; 267/254
(58) Field of Search ................... 280/124.134, 124.135, 280/124.136, 124.138, 124.139, 124.141, 124.143, 124.15, 124.179, 124.125, 124.128; 267/248, 254

(56) References Cited

U.S. PATENT DOCUMENTS

| 1,612,421 | A |   | 12/1926 | De Ram ..................... 267/254 |
|---|---|---|---|---|
| 4,529,056 | A | * | 7/1985 | Kreuz ......................... 280/284 |
| 4,653,604 | A | * | 3/1987 | de Cortanze ................ 280/284 |
| 4,854,603 | A | * | 8/1989 | Scaduto ............... 280/124.107 |
| 4,881,752 | A |   | 11/1989 | Tanaka ................ 280/124.136 |
| 4,927,169 | A |   | 5/1990 | Scaduto ............... 280/124.136 |
| 5,431,429 | A |   | 7/1995 | Lee ..................... 280/124.136 |
| 5,820,153 | A | * | 10/1998 | Pellerin ............... 280/124.136 |
| 5,821,434 | A | * | 10/1998 | Halliday .................... 280/5.52 |

* cited by examiner

Primary Examiner—Peter C. English
(74) Attorney, Agent, or Firm—Woodard, Emhardt, Naughton, Moriarty & McNett

(57) ABSTRACT

The invention provides a new method of vehicular suspension, whereby the attributes of greater design freedom, reduction of frontal area, lower center of gravity, increased fuel efficiency, decreased polar movement, increased safety due to improved handling and a more linear relationship of springing force to wheel travel are accomplished with the outboard primary lever (outrigger bell crank) and the associated linkages.

17 Claims, 8 Drawing Sheets

VEHICLE SUSPENSION

CROSS-REFERENCES

This application is a continuation-in-part of U.S. patent application, Ser. No. 09/477,323 filed Jan. 4, 2000, which claims priority to U.S. Provisional Application No. 60/114,965, filed Jan. 5, 1999. Both applications are hereby incorporated by reference.

FIELD OF THE INVENTION

The present invention deals generally with the field of vehicle suspensions, and more specifically deals with an improved vehicle suspension.

BACKGROUND OF THE INVENTION

While vehicle suspension systems have evolved from the leaf spring solid beam axle method of carrying the rolling wheels (by which a vehicle moves upon the road or over rough terrain) to independently sprung wheels, which provide a smoother ride for passenger or cargo, this invention enables a further improvement to prior systems.

Rather than having either a single leaf spring positioned laterally, or two leaf springs mounted longitudinally, to the vehicle chassis for solid beam axles, the most commonly used suspension system today is coil springs encircling shock absorbers arranged with independently attached wheels. With this method, a bump in the road or rough terrain will primarily affect only one wheel rather than directly affecting the other wheel, as is the case at the other end of a solid beam axle.

The independent method of wheel attachment is usually by hinged control arms (often called A-arms or wishbones, due to their shape), or by a single hinged arm and a sliding strut of the McPherson type. The independent method of vehicle suspension is fitted between the chassis and the individual wheel assemblies.

Heretofore, the coil spring/shock absorber or other springing devices, were most often attached directly to the lower of the hinged control arms at a distance of at least halfway out from the chassis. Sometimes further out, closer to the wheel assembly. While one end of the coil spring/shock absorber unit would be attached to the lower control arm, the other end of the coil/shock unit (or strut) would be attached directly to the chassis at a location higher than the wheel assembly and inboard (toward the chassis center line). The inboard inclination of the coil spring/shock absorber assembly would often be in the 40 to 45 degree from vertical range. Some racing vehicles had more extreme inclinations in the 50 to 60 degree range for their coil spring/shock unit or for the push/pull rod leading to the springing device.

As a wheel rolls over a bump, (or the outer wheel(s) move during cornering), the wheel rises in relation to the chassis, and thus the spring/shock absorber assembly is compressed. However, as the wheel assembly rises in a near vertical fashion, the coil spring/shock absorber combination is being compressed at angles from anywhere in the range of 40 to 60 degrees from vertical. This angularity results in the lack of a true direct relationship, since the springing unit does not travel in compression the same actual distance that the wheel travels. Part of the spring's true force is spent acting sideways rather than vertically, resulting in a reduction of the spring force applied in opposition to the vertical movement of the wheel. The ratio of spring pressure to wheel travel changes throughout the wheel's range of travel.

When installed at an angle, a spring will need to be of a higher rating (resistance to compression) since it is not acting in direct relationship to the vertical (near vertical) travel of the wheel. Obviously, the closer a spring and/or shock absorber, or the linkage, is mounted to the wheel assembly, the more efficient it will be. However, if the shock/spring unit or the linkage is inclined, there will not be a linear relationship of compression to travel. If the shock/spring unit or linkage is mounted further out on the lower control arm, it may be necessary for an even greater inclination, which would then require an even greater spring rate, resulting in a harsher ride for passenger or cargo.

It is important for the realization of the benefits of this novel solution to also realize the heretofore position of the coil spring/shock absorber in the inclined attitude, or the use of a nearer to vertical suspension strut (McPherson style), has necessitated the location of approximately half of either springing system's physical hardware above the axle line, and more often than not, above the upper control arm (A-arm/wishbone) as well.

The required use of space above the axle line and above the upper control arm for placement of the coil/shock, strut, air suspension, hydraulic, electro-mechanical or other suspension systems within the confines of the body (coachwork) exterior, restricts the stylist's freedom to design exterior surfaces to no lower than the highest point of the suspension assembly.

If it were possible to lower the height of the suspension assembly, stylists would be free to reduce the height of the exterior surface in that area, and therefore not only create new designs, but when applied to the forward or leading edge surfaces of a vehicle, reduce the frontal area and decrease drag (wind resistance). Such a reduction of frontal area would achieve the economy of increased fuel mileage, the capability of higher top speed with the same of amount of propulsive power or maintain the same top speed with less propulsive energy.

SUMMARY OF THE INVENTION

A preferred embodiment of the present invention provides a vehicle suspension system mounting a wheel, skid or track assembly to a vehicle chassis. The suspension system includes a control arm (such as an A arm or wishbone) having opposing first and second ends. A first end of the control arm is pivotally coupled to the wheel, skid or track assembly, and a second end of the control arm is pivotally mounted to the vehicle chassis. A first bell crank has a fulcrum mounted to the vehicle chassis adjacent to the wheel, skid or track assembly. The first bell crank has a first lever arm and a second lever arm, where the first lever arm and the second lever arm are oriented to define a substantially vertical plane. A first link member or pull rod has a first end pivotally connected to the control arm and a second end pivotally connected to the first lever arm of the first bell crank.

A second bell crank also has a fulcrum mounted to the vehicle chassis, where the second bell crank has a first lever arm and a second lever arm. A second link member has a first end pivotally connected to the second lever arm of the first bell crank and a second end pivotally connected to the first lever arm of the second bell crank. A springing assembly is coupled between the second lever arm of the second bell crank and the vehicle chassis.

In one preferred embodiment of the vehicle suspension system the second link member is mounted substantially horizontally. Also in a preferred embodiment, the first lever arm and the second lever arm of the second bell crank define a second plane and are mounted so that the second plane intersects the vertical plane of the first bell crank along a line defined through the length of said second link member.

It is a preferred object of the present invention to provide an improved apparatus and method to form a vehicle suspension.

Further objects, features and advantages of the present invention shall become apparent from the detailed drawings and descriptions provided herein.

DESCRIPTION OF PREFERRED EMBODIMENTS

Figure 1:
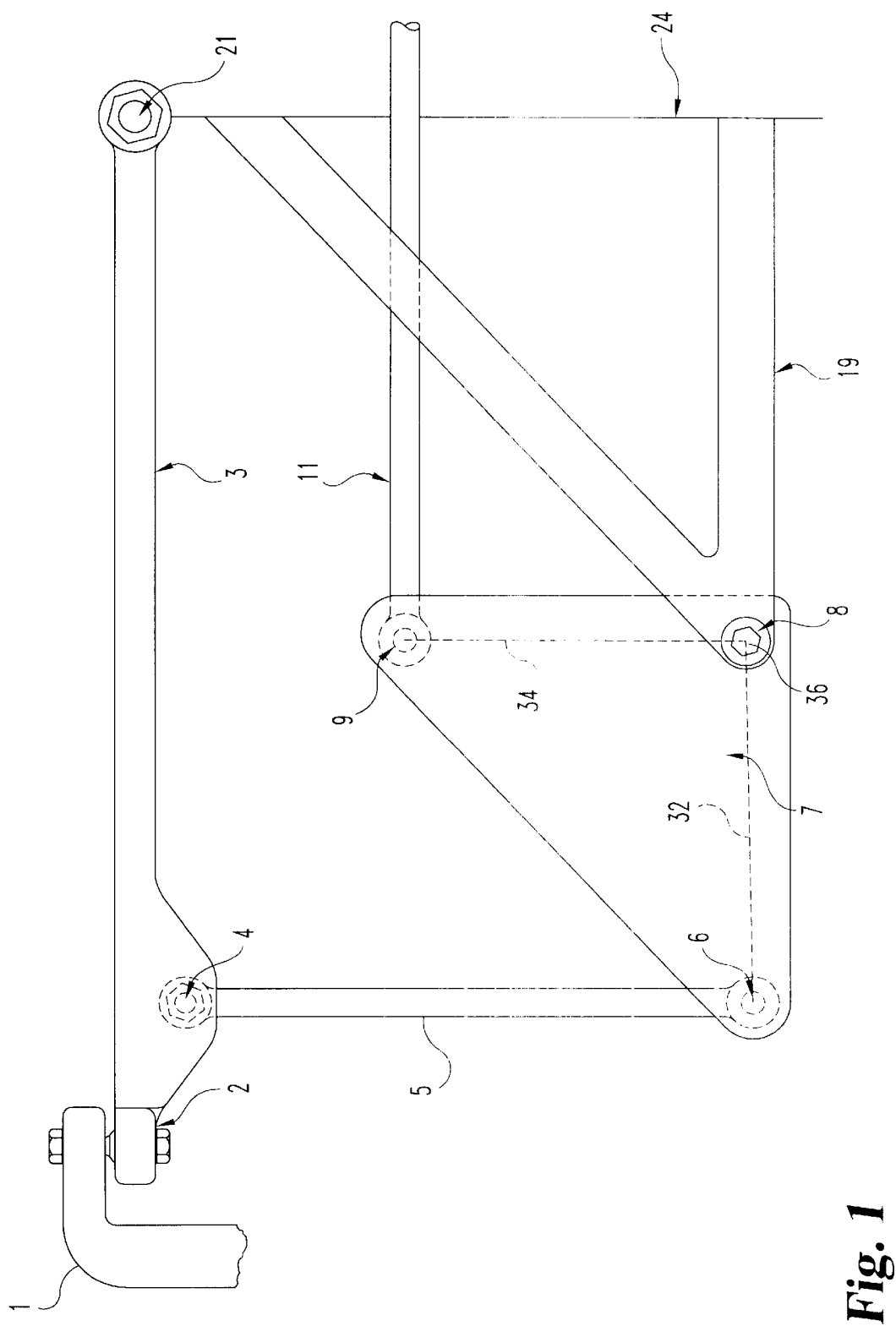
FIG. 1 is a side view of a preferred embodiment of the present invention.

For the purposes of promoting an understanding of the principles of the invention, reference will now be made to the embodiments illustrated and specific language will be used to describe the same. It will nevertheless be understood that no limitation of the scope of the invention is thereby intended, such alterations, modifications, and further applications of the principles of the invention being contemplated as would normally occur to one skilled in the art to which the invention relates.

As illustrated in FIGS. 1–6, a preferred embodiment of the present invention involves a suspension system for use with a vehicle. The suspension system can be connected to a wheel, skid or track assembly. The articulated vertical link member (pull rod 5), which connects the upper control arm 3 (for the top portion of the wheel assembly's upright) to the primary lever 7, the primary lever itself (outrigger bell crank 7), and the horizontally oriented link member 11 (also articulated) along with the secondary lever 14 (inboard bell crank), which then relates to the springing system, are all components for the basis of this new and useful vehicle suspension system.

Figure 3:
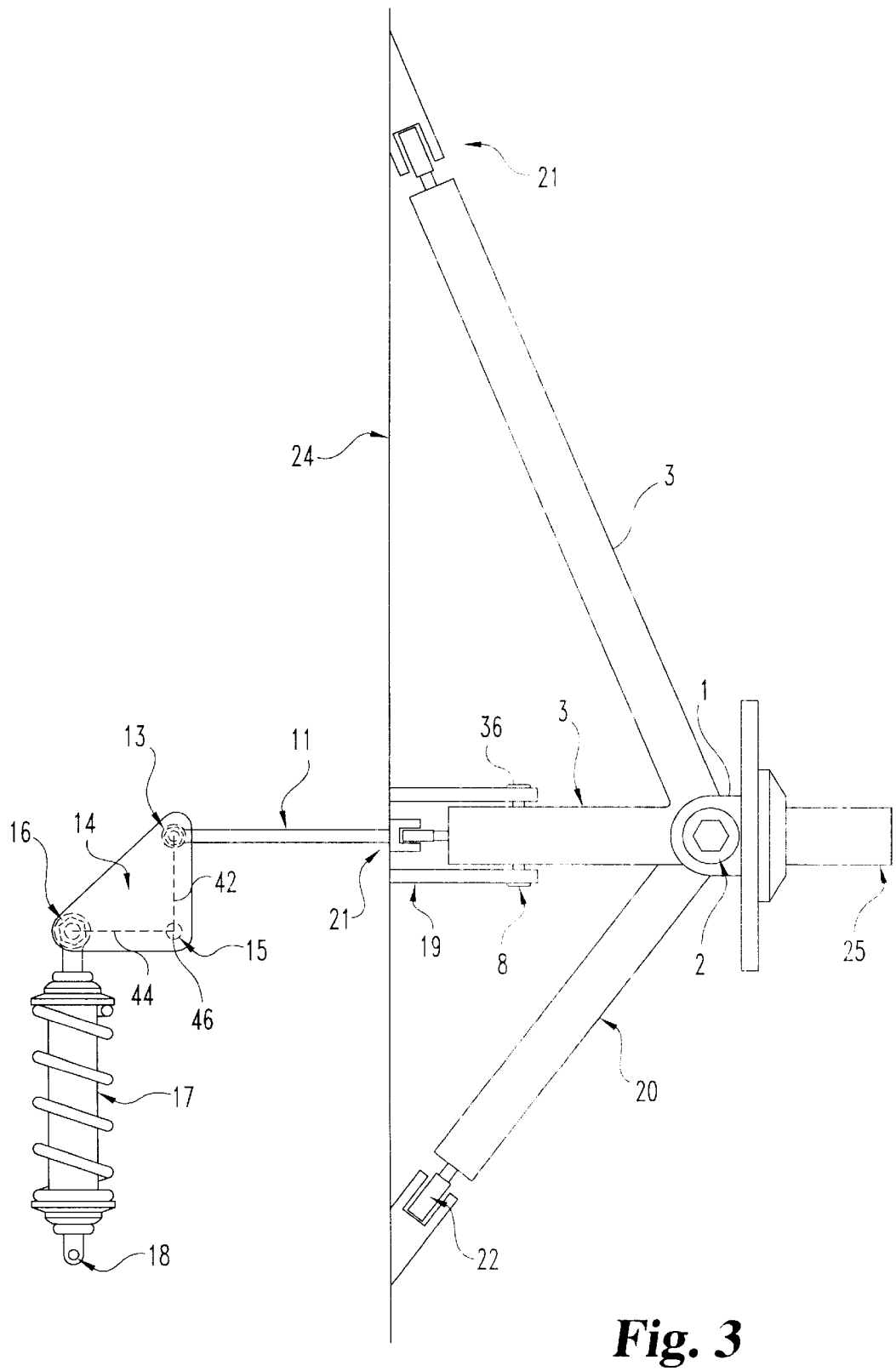
FIG. 3 is a top view of the embodiment illustrated in FIG. 1 with further detail.
Figure 4:
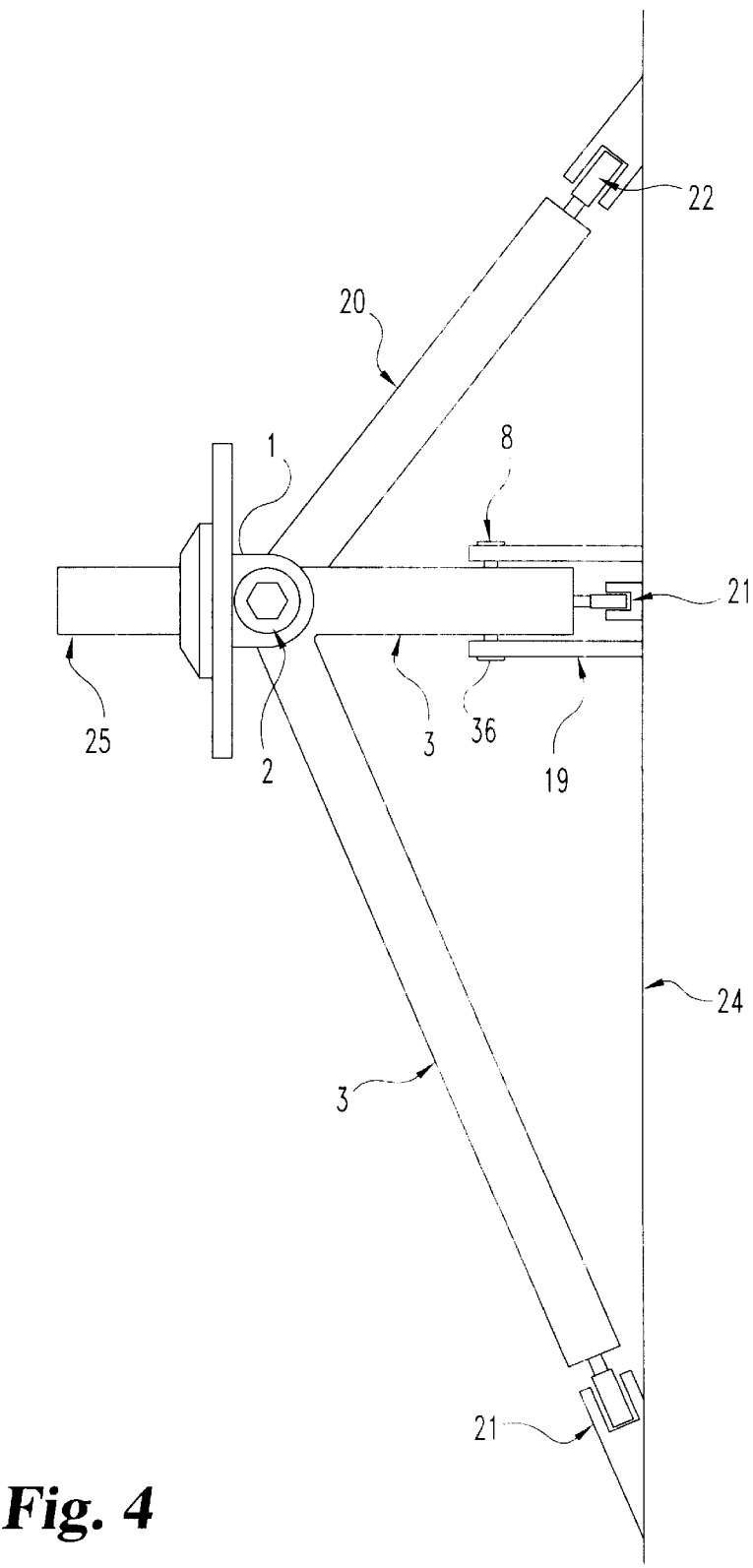
FIG. 4 is a top view of the embodiment illustrated in FIG. 2.
Figure 5:
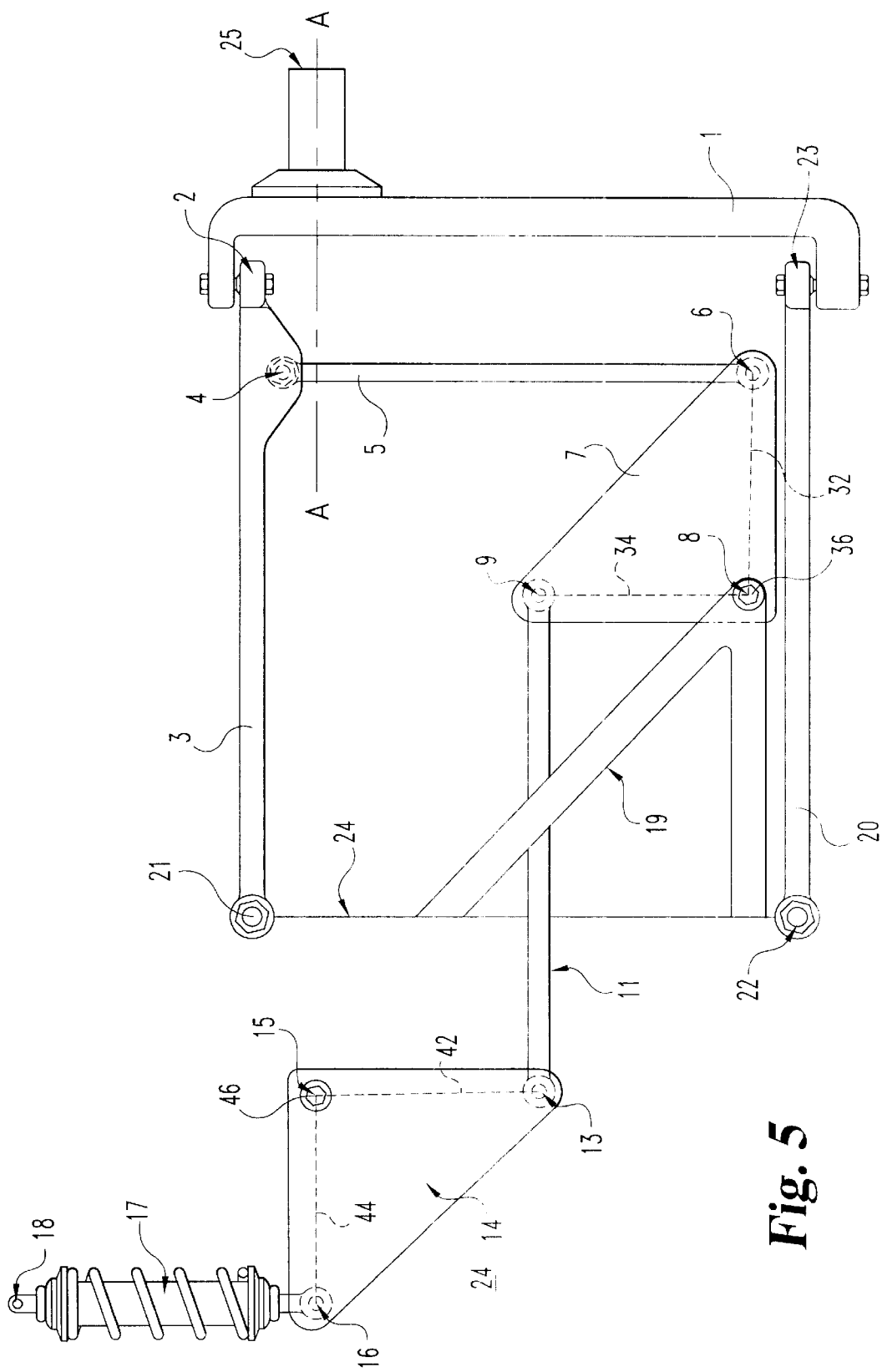
FIG. 5 is a side view of an alternate arrangement of the preferred embodiment illustrated in FIGS. 1 and 3.
Figure 6:
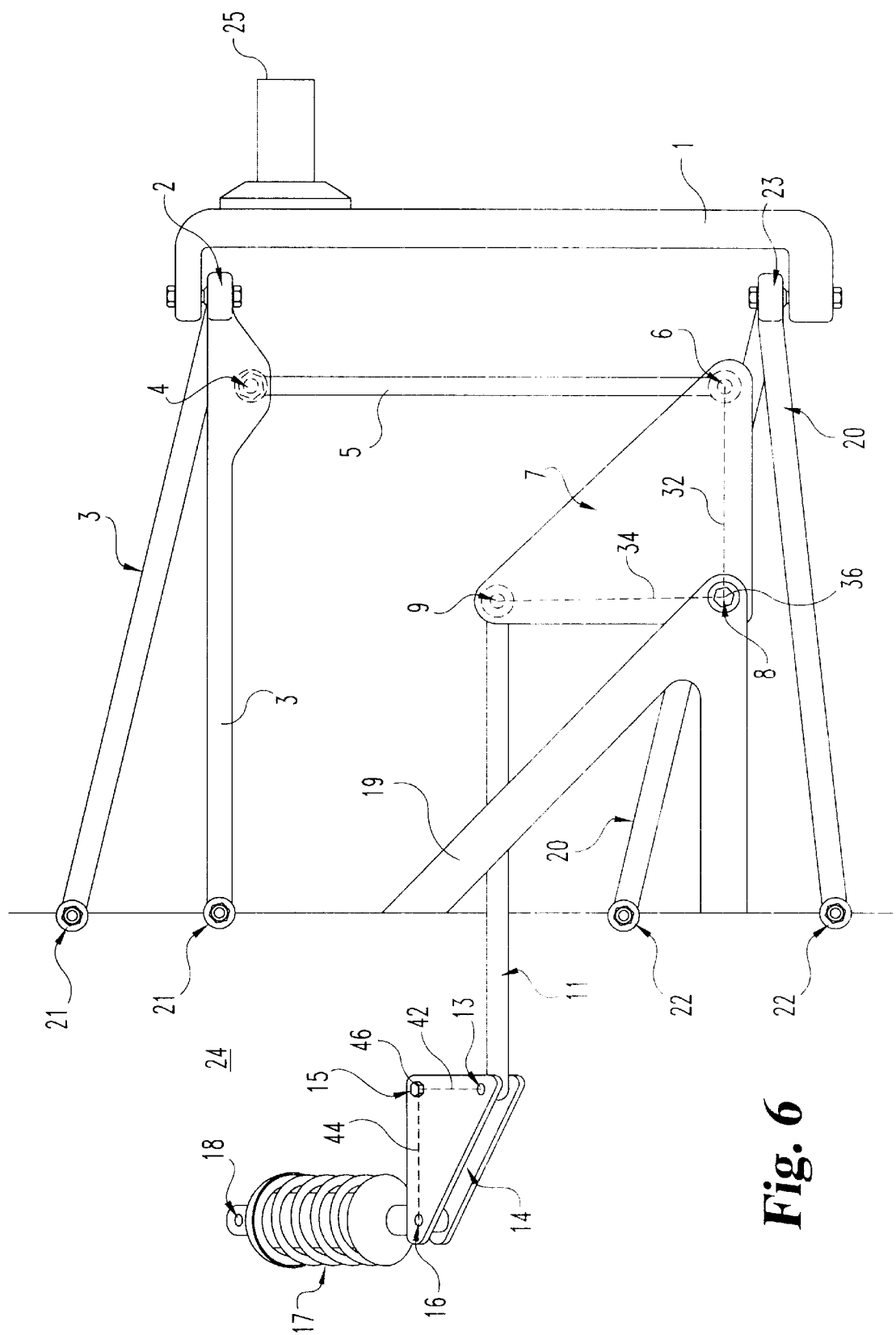
FIG. 6 is a perspective side view of an alternate arrangement of the embodiment illustrated in FIG. 5.

An upper control arm 3 (A-arm/wishbone/locating arm) extends from a hinged connection 21 on vehicle chassis 24 to an articulated joint 2 associated with a top portion of the upright 1. Vehicle chassis 24 is illustrated schematically in the figures without showing specific details. Upright 1 includes stub axle 25 where a wheel/skid/track assembly may be attached. In one embodiment, upper control arm 3 is shaped in an acutely angled "L" shape with one leg extending from the upright 1 and attached either rearward or forward of the wheel to the vehicle chassis 24 (FIG. 3), and the other leg extending from the upright 1 substantially perpendicular to the vehicle chassis 24. Also, as shown in FIGS. 3, 5 and 6 lower control arm 20 is mounted between vehicle chassis 24 and a lower portion of upright member 1 by hinged connection 22 and articulated joint 23. Lower control arm 20 has an obtusely angled "L" shape with one leg extending from the lower portion of upright member 1 forward to the vehicle chassis 24 (FIG. 6) and the other leg extending from the lower portion of upright member 1 to the rearward of vehicle chassis 24 (FIG. 6). Upper and lower control arms 3 and 20 maintain the forward/back spacing and clearance of the upright member 1 with respect to vehicle chassis 24.

In one preferred embodiment, an outboard primary lever or bell crank 7 is mounted in a vertically oriented plane to vehicle chassis outrigger 19. Preferably bell crank 7 is oriented perpendicularly to the longitudinal axis (center line, not shown) of the vehicle chassis 24. It is also possible to allow a different angle to the centerline without hindering the advantages or functioning of the system, thus further enabling more freedom in final location of springing components.

In a preferred embodiment, the fulcrum 36 of bell crank 7 is mounted at connection position 8 to outrigger 19 below axle line "A" of stub axle 25. The bell crank 7 defines a first lever arm 32 and a second lever arm 34. First lever arm 32 extends from fulcrum 36 to the primary bell crank's first connection point 6. Second lever arm 34 extends from fulcrum 36 to the primary bell crank's second connection point 9. The first connection point 6 of primary lever 7 is articulately connected by a substantially vertically oriented link member (pull rod 5) to an outer position on control arm 3. With this relationship, the wheel assembly's vertical distance traveled up or down and force generated, is directly transferred from stub axle 25 of the upright 1 via articulated joint 2 into the upper control arm 3, and transmitted via connection 4 into the vertical link member 5. Vertical link member 5 transmits its force and distance traveled via connection 6 into rotation of primary bell crank 7.

A horizontally oriented, articulately connected link member 11 extends inboard from the second pivotal connection point 9 of primary bell crank 7 (FIGS. 1 and 5) and is pivotally coupled to first connection point 13 of a second bell crank 14 (FIGS. 3 and 5). Rotation of bell crank 7 causes horizontal link member 11 to transmit force to second bell crank 14. The fulcrum 46 of second bell crank 14 is mounted to vehicle chassis 24 at a mounting point 15. Second bell crank 14 defines a first lever arm 42 extending from fulcrum 46 to first connection point 13, and a second lever arm 44 extending from fulcrum 46 to a second connection point 16.

Figure 8A:
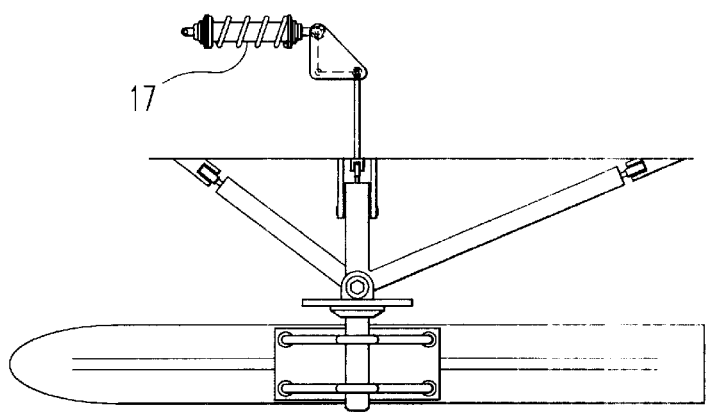
FIGS. 8A, 8B and 8C are top views of preferred embodiments for the present invention connected to skid, wheel and track assemblies.
Figure 8B:
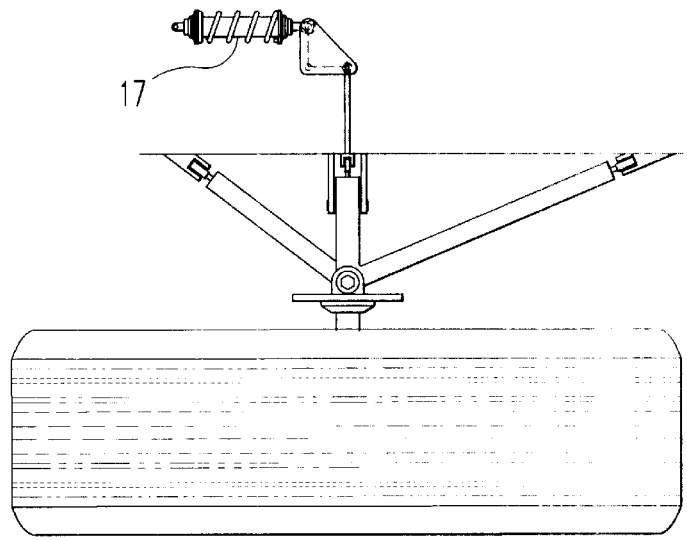
Figure 8C:
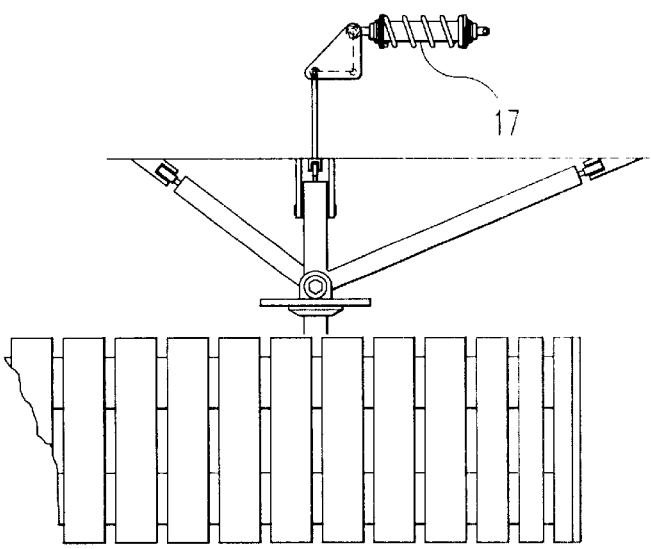

Second connection point 16 is pivotally coupled to springing assembly 17, such as but not restricted to a coil spring, shock absorber, torsion bar, pneumatic, electro-pneumatic, hydraulic, electro-hydraulic, magnetorheological or the like assembly. Springing assembly 17 is articulately mounted at its terminal end 18 to vehicle chassis 24 (see FIGS. 3, 5 and 6). Force transmitted via first lever arm 42 and second lever arm 44 of second bell crank 14 is trnsmitted to springing assembly 17. Springing assembly 17 contracts or expands in reaction to the force and provides resistance to regulate the end movement of the wheel, skid or track assembly in relation to the vehicle (FIGS. 8A, 8B and 8C). When the vehicle has traveled further or settled such that stub axle 25 has less applied force, springing assembly 17 normalizes itself by expanding or contracting to transmit force in reverse through the suspension system, returning stub axle 25 to its desired relationship with the chassis.

Figure 2:
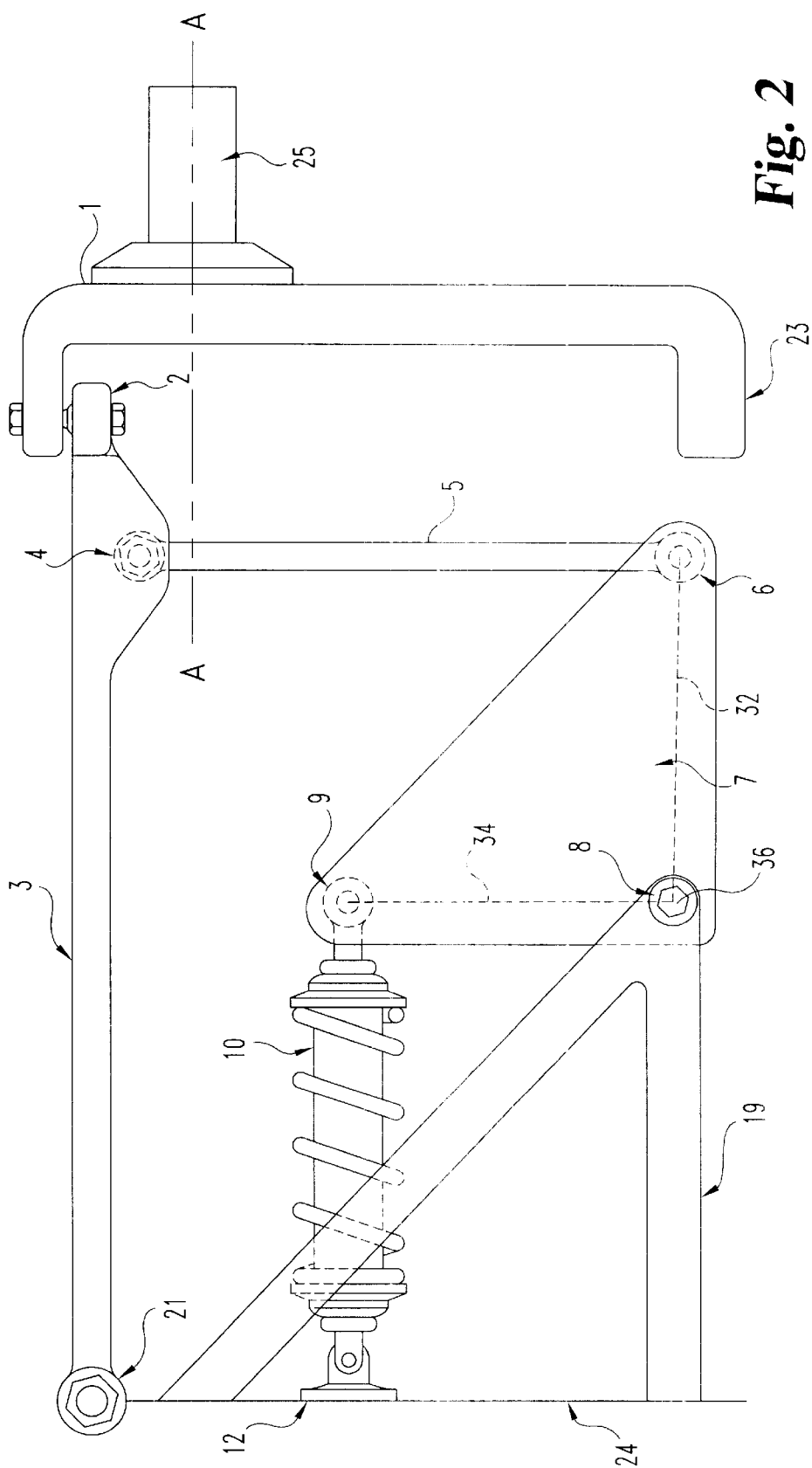
FIG. 2 is a side view of an alternate preferred embodiment of the present invention.

In an alternate preferred embodiment, primary lever 7 is coupled directly to a springing assembly 10 without the use of a horizontal link member (see FIG. 2). The springing assembly 10 is mounted to the chassis 24 at mounting point 12. In this embodiment, rotational force of primary bell crank 7 is directly transmitted to springing assembly 10, which functions in a similar manner to springing assembly 17.

Figure 7:
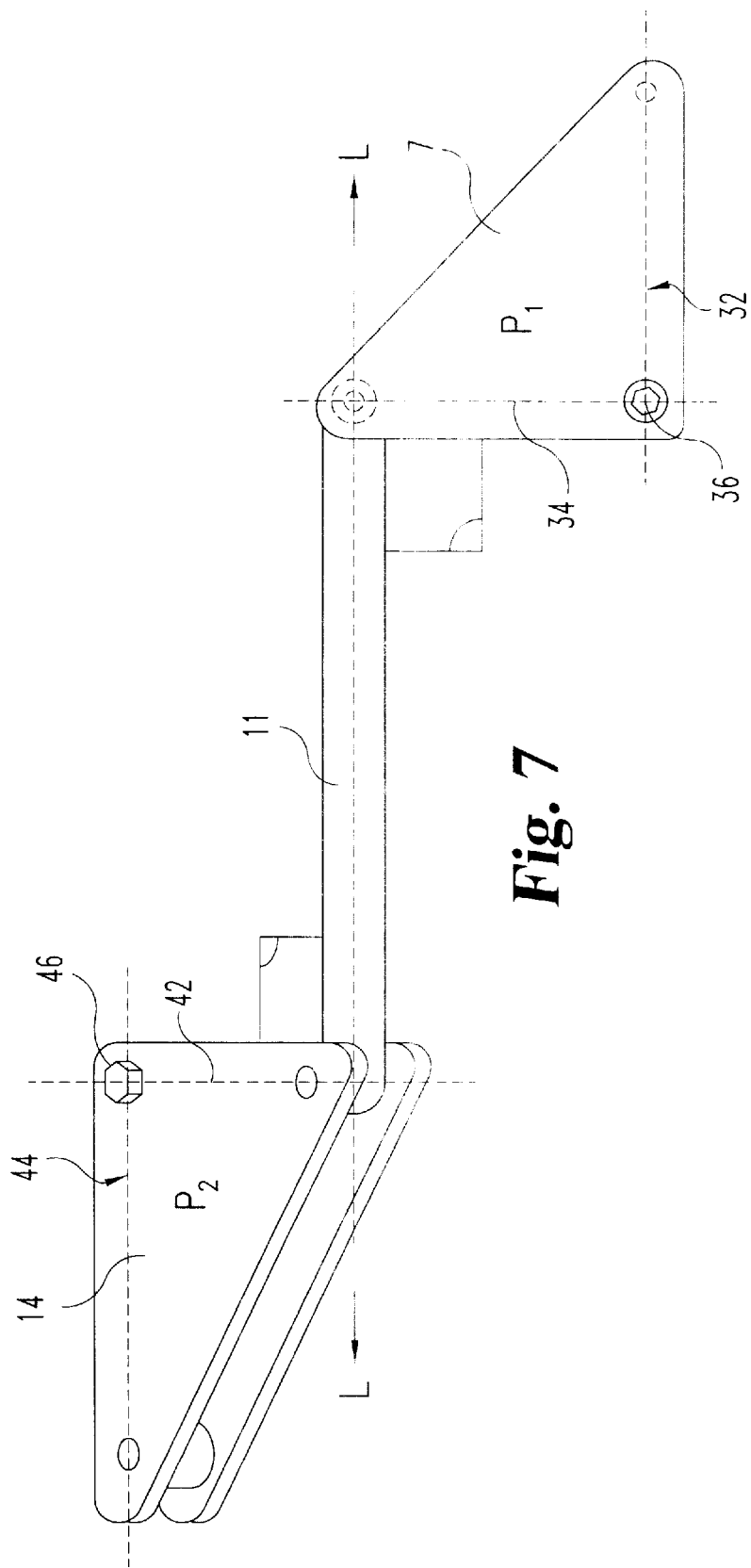
FIG. 7 is a perspective view of the geometry of a preferred embodiment of the present invention.

As geometrically illustrated in FIG. 7, in a preferred embodiment primary bell crank 7 is oriented in a substantially vertical plane P1 defined by the axes of first lever arm 32 and second lever arm 34. The axes of first lever arm 42 and second lever arm 44 of second bell crank 14 define a second plane P2 which is oriented substantially perpendicularly to vertical plane P1. The perpendicular intersection of plane P1 and P2 is along line L extending longitudinally through horizontal link member 11. Rotation of plane P2 around line L allows placement of second bell crank 14 and springing assembly 17 in various locations within the vehicle chassis as desired by the designer or engineer.

The invention's attribute of accomplishing an improved linear relationship of a vehicle's wheel, skid or track jounce and rebound travel to springing compression and extension is obtained by the novel positioning and outrigger structure 19 for the fulcrum 36 or pivot of the primary lever (bell crank) 7 far outward from the chassis center line, thus the outrigger nomenclature. By such placement, there is a more accurate relationship of vertical wheel travel at the end of the vertical link member (pull rod 5) than if the link member were at 45 degrees of angle. Since the primary lever (outrigger bell crank 7) is positioned in a vertical plane, the force and amount of vertical travel of the wheel, skid or track assembly and its upright 1 is relayed via the articulated joint 2 into the upper control arm 3, and then into the primary lever (outrigger bell crank 7) by the vertical link member (pull rod 5). The force and distance is then transmitted in a horizontal path by the second lever arm of the primary lever 7. As stated, the force and amount of travel can then either be transmitted directly into a horizontally oriented springing assembly 10, or can be further transmitted toward the chassis center line by a horizontally oriented link member 11. When a horizontally oriented link member transmits the travel and force amounts deeper into the chassis to a secondary lever (inboard bell crank 14), it is then possible to mount both secondary bell crank 14 and the springing system 17 in most any plane desirable. The secondary bell crank 14 enables such options as placing the springing assembly 17 in front, behind, above or below the axle line while still maintaining the accuracy of the linear relationship established by the primary bell crank 7.

While it is possible to angle the relationship of the primary lever (outrigger bell crank 7) to other than near perpendicular to the chassis's longitudinal axis, such an orientation may not be one of the many packaging variations preferred by the automotive engineer. However, on the occasion of desiring to direct the load path and distance traveled of the mass of the hub and wheel assembly to a location on the chassis that is not located perpendicularly from the subject mass, the outrigger bell crank may be so oriented and will still perform it's functions efficiently.

Although one of the preferred methods of operation for this suspension system does not require use of the horizontal link member or the secondary lever (inboard bell crank), these are still preferred options of the invention. Depending on an engineer's objectives, one method may be more suitable than another.

The wheel, skid or track assembly is attached to stub axle 25 (FIGS. 8A, 8B and C). The present invention is applicable for steered or non-steered wheels, as well as for driven or non-driven wheels. The disc or drum of a braking device for a wheel rotates with the wheel assembly, while the caliper for disc brake or the backing plate and shoes of a drum brake would be fixedly attached to the upright. In the instance of steering requirements, a steered wheel would have a steering arm as part of the upright.

For clarity of explanation, FIGS. 1 and 2 do not show the hinged lower control arm 20 attached to the bottom of the upright 1. The drawings of this invention for a vehicle suspension system focus on showing the principle of the new method of suspension, no matter whether the application would be for front, rear, mid-axle, and no matter whether the wheel be steered/non-steered or driven/non-driven. This invention is also applicable to tracks and skids.

The invention provides a new method of vehicular suspension, whereby the attributes of fuel efficiency, greater design freedom, reduction of frontal area, lower center of gravity, decreased polar movement, increased safety due to improved handling and a more linear relationship of spring pressure to wheel travel are accomplished with the outboard primary lever (outrigger bell crank 7) and the associated linkages with the secondary inboard bell crank 14.

The invention introduces a practical arrangement by which the springing assembly can be completely part of the sprung mass of the chassis 24, thereby reducing unsprung weight. Previously, one half of the weight of the coil spring/shock or McPherson style strut attached to the control arm was unsprung weight. Unsprung weight reduction adds to safety and is an improvement in the quality of the ride for passenger or cargo. The ability of any driven or non-driven wheel to maintain contact with the ground's surface is enhanced when it weighs less. A reduced mass is easier to control and the wheel will require a reduced spring rate, therefore leading to a more supple ride. The lighter a wheel is, the more time it will spend in contact with the road therefore improving vehicle control and safety.

It has been said that a one pound reduction of unsprung weight relates equally to a reduction of fifteen pounds of vehicle sprung mass when evaluating the quality of a vehicle's comfort and handling.

The invention's primary lever (outrigger bell crank 7), though far outboard mounted in one embodiment, is chassis mounted via outrigger structure 19 at its fulcrum 36, and while the outrigger is sprung weight, the primary lever would be classified as 50% sprung weight. The secondary lever (bell crank 14) is inboard chassis mounted, as are its associated shock/coil or other springing device(s) 17, thusly classifying these elements in the fully sprung weight category.

The inventor recognizes that for such vehicles as racing cars, the location of coil springs and shock absorbers, pneumatic, hydraulic or other springing devices has commonly been sprung weight within the chassis for many years. The method by which such racing cars operate the coil spring/shock absorber/swaybar or other springing systems is by a singular push-rod or pull-rod running from the A arm/wishbone/control arm (in the area of its attachment to the wheel assembly's upright) upwardly for a push-rod or downwardly for a pull-rod, directly to the chassis-mounted springing device. However, the angle of the push-or pull-rod is far more extreme than the 40 or 45 degree coil/shock/strut installation of production car assemblies, which run from the hinged A-arm/wishbone/control arm to the chassis. In order for the racing cars to compensate for the extreme (25 to 30 degrees from horizontal range) angle of the push-or pull-rod, the suspension spring pressure is multiplied by a factor in the range of three. For such racing cars, the section of the inboard, chassis-mounted bell crank, which is connected to the chassis-mounted springing device, is approximately three times longer from the pivot point than is the opposing side, which is connected to the push-or pull rod. An extremely stiff ride is the result, but with racing cars, that is desirable and acceptable. Since a passenger or cargo carrying vehicle requires a softer, more compliant ride for the chassis, the extreme stiffness of the racing vehicle is unacceptable.

The invention's innovative solution of an outrigger bell crank 7 makes possible a more direct relationship of vertical (near vertical) wheel travel and force to the compression travel of the springing system 17 or 10, (coil spring, torsion bar, electro-hydraulic, pneumatic, et. al) thereby affording the capability for a softer, more compliant ride with independent suspension. Although bell crank 7 is illustrated with a vertical pull rod 5 extending upwards, the pull rod could be a push rod extending from the lower control arm or can be varied based on the location and orientation of the primary bell crank. The greatest efficiency is achieved when bell crank 7 is mounted in a substantially vertical plane.

In a preferred embodiment, the first and second lever arms of primary bell crank 7 are of equal length and the first and second lever arms of second bell crank 14 are of equal length. This provides a one-to-one ratio of movement of the lever arms when a bell crank is rotated. The outrigger bell crank application makes it possible for the use of a one-to-one ratio lever so that the true vertical (near vertical) travel of the wheel assembly can be fully and comfortably transferred to the chassis mounted springing system 10 or 17. The upward travel and force of the independent wheel assembly is converted to an equal (ignoring friction) horizontal travel and force via the primary lever alone into the springing device 10, or transmitted further by the horizontal link member 11 to the secondary lever 14, and then into the springing device 17. The outrigger bell crank system can even assist in hardware placement for solid beam axles.

If there is a desire for adjustment of the handling characteristics, such as spring rate, or capability of carrying cargo, the invention is not restricted to a one-to-one ratio for either the outrigger bell crank 7 or the inboard bell crank 14. The relative lengths of first and second lever arms can use different distances from the pivot point 36 or 46 to the respective connection points 6, 9, 13 or 16. In an alternate design, the standard 90 degree relationship of the lever arms in the bell cranks can be adjusted between 0 to 180 degrees so that the lever arms can be more acute or obtuse from their respective pivot points, which would allow the lever arms to range from perpendicular to parallel with each other. In this arrangement, springing device 17 can range from perpendicular to parallel and/or can be co-existent with linking member 11.

In a preferred embodiment, the fulcrum 36 of primary lever arm 7 is offset from the central axis A of stub axle 25. In one preferred embodiment for racing, fulcrum 36 is mounted to outrigger 19 or vehicle chassis 24 below central axis A, lowering the accompanying weight and thus the center of gravity. In an alternate embodiment, the fulcrum and bell crank can be mounted above central axis A allowing greater ground clearance for other types of vehicles such as SUV's, rough terrain or military vehicles. In a further embodiment, primary bell crank 7 and link member 5 may be repositioned so that link member 5 extends from connection point 6 downward to a portion of lower control arm 20 or from above down to upper arm 3, in which case link member 5 becomes a push rod. In another alternate embodiment, link member 5 may extend upward from primary bell crank 7 to a structure extending from lower control arm 20.

Advantages of Preferred Embodiments Of The Present Invention

1. Improved linear relationship of vehicle wheel/skid/track travel and force to the compression and rebound of the springing system.
2. Reduction of unsprung weight improves vehicle control, comfort and safety.
3. Reduced frontal area improves aerodynamics by lowering coefficient of drag factor thereby increasing fuel economy and/or top speed.
4. Increased control and safety due to the improved relationship of vehicle mass to vehicle contact patches because of the lower and wider locations of the chassis suspension input points (outrigger bell cranks).
5. Efficient packaging of vehicle components due to increased opportunities to place suspension springing units most anywhere relative to axle line.
6. Improvement of polar moment and/or achieving a lower center of gravity due to the options of placement of vehicle springing devices (spring/shock units).
7. More chassis adjustment and suspension tuning options are available to accommodate passenger, cargo load or vehicle use variations, than by other suspensions where changing the spring rate is the only method to alter vehicle characteristics.
8. Elimination of the inherently increased loads to the control arms when extremely angled push-or pull-rods are utilized.
9. Increased lateral force (cornering performance) is generated by tires due to the effect of chassis weight transfer acting in a vertically downward path rather than the angular path of other suspension systems. That is to say . . . with the utilization of the outrigger bell crank and the vertical pull-rod, there is more downward vertical force being applied to the tire, forcing it into the ground for the benefit of lateral (cornering) force than would otherwise be applied with an inclined coil/shock at 45 degrees or by a similarly (or greater) inclined push-or pull-rod system.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A vehicle suspension system mounting a wheel, skid or track assembly to a vehicle chassis, comprising:

a) a control arm having opposing first and second ends, wherein said first end is pivotally mounted to the wheel, skid or track assembly and wherein said second end is pivotally mounted to the vehicle chassis;

b) a first bell crank having a fulcrum mounted to the vehicle chassis adjacent to the wheel, skid or track assembly, wherein said bell crank has a first lever arm and a second lever arm, and wherein said first lever arm and said second lever arm are oriented to define a substantially vertical plane;

c) a first link member having a first end pivotally connected to said control arm and a second end pivotally connected to said first lever arm of said first bell crank;

d) a second bell crank having a fulcrum mounted to the vehicle chassis wherein said second bell crank has a first lever arm and a second lever arm;

e) a second link member having a first end pivotally connected to said second lever arm of said first bell crank and a second end pivotally connected to said first lever arm of said second bell crank; and, f) a springing assembly coupled between said second lever arm of said second bell crank and the vehicle chassis.

2. The vehicle suspension system of claim 1 wherein said second link member is mounted substantially horizontally.

3. The vehicle suspension system of claim 2 wherein said first lever arm and said second lever arm of said second bell crank define a second plane and wherein said second bell crank is mounted so that said second plane intersects said vertical plane along a line defined through the length of said second link member.

4. The vehicle suspension system of claim 3 wherein the wheel, skid or track assembly defines an axle line and wherein the fulcrum of said first bell crank is mounted to the vehicle chassis below the axle line.

5. The vehicle suspension system of claim 2 wherein said first lever arm and said second lever arm of said first bell crank are substantially equal in length and wherein said first lever arm and said second lever arm of said second bell crank are substantially equal in length.

6. The vehicle suspension system of claim 2 wherein said springing assembly is mounted in a direction substantially perpendicular to said second link member.

7. The vehicle suspension system of claim 6 wherein said first link member is mounted in a direction substantially perpendicular to said second link member.

8. The vehicle suspension system of claim 2 further comprising an outrigger extending away from the vehicle chassis adjacent to the wheel, skid or track assembly and wherein said first bell crank is mounted to said outrigger.

9. A vehicle suspension system mounting a wheel, skid or track assembly to a chassis of a vehicle, comprising:

a) a control arm extending between the wheel, skid or track assembly and the chassis;

b) an outrigger extending from the vehicle chassis adjacent to the wheel, skid or track assembly;

c) a primary lever, having a pivot point mounted to said outrigger and below said control arm, and defining a first lever arm and a second lever arm;

d) a pull rod connected to said control arm and said first lever arm of said primary lever;

e) a secondary lever having a pivot point mounted to the vehicle chassis and defining a first lever arm and a second lever arm;

f) a push rod connected to said second lever arm of said primary lever and said first lever arm of said secondary lever; and, g) a springing assembly mounted to the chassis and connected to said second lever arm of said secondary lever.

10. The vehicle suspension system of claim 9 wherein said pull rod is oriented in a substantially vertical direction and wherein said push rod is oriented in a substantially horizontal direction.

11. The vehicle suspension system of claim 10 wherein said springing assembly is mounted in a direction substantially perpendicular to said push rod.

12. A method of suspending a wheel, skid or track assembly to a chassis of a vehicle, comprising the steps of:

a) providing a wheel, skid or track assembly for a vehicle chassis wherein a control arm extends from the vehicle chassis to the wheel, skid or track assembly;

b) extending a first rod from said control arm to one connection point of a primary bell crank substantially vertically mounted on the vehicle chassis;

c) extending a second rod in a substantially horizontal direction from a second connection point on said primary bell crank to a first connection point on a second bell crank mounted to the vehicle chassis; and, d) disposing a springing assembly between a second connection point on said second bell crank and the vehicle chassis.

13. The method of claim 12 wherein said first rod is mounted in a substantially vertical orientation.

14. The method of claim 12 further comprising the step of mounting said second bell crank to the vehicle chassis in a manner wherein said primary bell crank defines a substantially vertical plane and where said second bell crank defines a second plane and wherein said vertical plane and said second plane intersect at a longitudinal line defined through said second rod.

15. The method of claim 14 further comprising the step of mounting said primary bell crank to the vehicle chassis below said control arm.

16. The method of claim 15 wherein said wheel, skid or track assembly defines an axle line and wherein said primary bell crank is mounted to the vehicle chassis below the axle line.

17. The method of claim 16 further comprising the step of mounting said springing assembly in a line substantially perpendicular to said second rod.

* * * * *